United States Patent

Horiuchi et al.

[11] Patent Number: 6,000,289
[45] Date of Patent: Dec. 14, 1999

[54] TORQUE DETECTING DEVICE FOR A FLEXIBLE MESHING TYPE GEAR

[75] Inventors: Masashi Horiuchi, Nagano-ken; Kaneo Mohri, Aichi-ken, both of Japan

[73] Assignee: Harmonic Drive Systems, Inc., Tokyo, Japan

[21] Appl. No.: 08/875,086

[22] PCT Filed: Dec. 6, 1996

[86] PCT No.: PCT/JP96/03588

§ 371 Date: Sep. 8, 1997

§ 102(e) Date: Sep. 8, 1997

[87] PCT Pub. No.: WO97/21991

PCT Pub. Date: Jun. 19, 1997

[30] Foreign Application Priority Data

Dec. 8, 1995 [JP] Japan .................................. 7-320846

[51] Int. Cl.[6] .................................................. G01L 3/02
[52] U.S. Cl. ............................................... 73/862.325
[58] Field of Search ....................... 73/862.325, 862.326, 73/862.335

[56] References Cited

FOREIGN PATENT DOCUMENTS

| | | | |
|---|---|---|---|
| 63-9801 | 3/1988 | Japan . | |
| 63-009801 | 4/1988 | Japan | 73/862.325 |
| 2-310438 | 12/1990 | Japan | 73/862.325 |
| 6-117944 | 4/1994 | Japan | 73/862.325 |
| 6-185580 | 7/1994 | Japan | 73/862.325 |

Primary Examiner—Benjamin R. Fuller
Assistant Examiner—Jewel V. Thompson
Attorney, Agent, or Firm—Burns, Doane, Swecker & Mathis LLP

[57] ABSTRACT

An approximate straight line A1 of detected values showing magnetic impedance changes relative to a torque change obtained at an end portion (31a) of a body portion (31) of a cup-shaped flexible external gear (3) of a flexible meshing type gear inclines oppositely to an approximate straight line A2 of detected values showing magnetic impedance changes relative to a torque change obtained at a boundary portion (4) between a diaphragm (32) and a boss (33) of the flexible external gear. Based on these two approximate straight lines A1, A2, it is possible to obtain a torque detecting characteristic A3 that passes through a zero point and has a linearity. As a result of this, it is possible to realize a torque detecting device that can detect the rotational torque of the flexible meshing type gear with a configuration different from a conventional one and with accuracy.

Based thereupon, it is possible to detect the rotational torque of the flexible meshing type gear with accuracy.

6 Claims, 5 Drawing Sheets

(A)

(B)

(C)

TORQUE DETECTING DEVICE FOR A FLEXIBLE MESHING TYPE GEAR

TECHNICAL FIELD

This invention relates to a flexible meshing type gear, and more particularly to a torque detecting device for a flexible meshing type gear which can detect torque with accuracy.

BACKGROUND ART

A servo system is used in a driving mechanism for driving an object to be controlled such as a robot and the like, and it is desirable in this case that torque applied to the object to be controlled be regulated. For that purpose, generally a torque detecting device is provided between a reduction unit composing a driving force transmission mechanism and an object to be controlled in order to detect transmission torque. For an appropriate torque detection, it is desirable that a reduction unit is provided therein with a torque detecting mechanism. In such a torque detecting mechanism, there have known a method of using a strain gauge, and that of measuring impedance of a magnetic-material-coated rotational part of a reduction unit.

As a reduction unit accommodated in a servo system, a flexible meshing type gear is known. The flexible meshing type gear is widely used in a system requiring drive control with accuracy, because the device of this type has a small number of parts and can give high reduction gear ratio. As a torque detecting mechanism for the flexible meshing type gear, there is a mechanism in which a strain gauge is adhered on a component flexible external gear. There is also a mechanism in which an outer periphery of a flexible external gear is coated with a magnetic material, and at the same time a magnetic head is placed in a position facing the coated position.

DISCLOSURE OF THE INVENTION

The inventors et al. confirmed that magnetic impedance varies according to internal stress when the rotational torque is applied to a flexible external gear, a component of a flexible meshing type gear.

The object of this invention is to provide a torque detecting device for a flexible meshing type gear with a configuration different from a conventional one, which can detect torque with accuracy, making use of a change in magnetic impedance generated in a flexible external gear.

The inventors et al. examined a change in magnetic impedance of a flexible external gear and found that there is a position where the positive rate of change of magnetic impedance turns negative, and vice versa, as an inherent property of the flexible external gear. This invention was realized on the basis of this discovery.

Namely, according to this invention, in a flexible meshing type gear which has a circular rigid internal gear, a circular flexible external gear placed inside the rigid internal gear and having external teeth which can mesh with internal teeth of the rigid internal gear, and a wave generator for deforming the flexible external gear radially to mesh the external teeth partially with the internal teeth and for moving meshing positions of the teeth in the circumferential direction so that relative rotation is generated between the rigid internal gear and the flexible external gear according to a difference in tooth number between the external teeth and the internal teeth; the flexible meshing type gear is provided with first and second magnetic impedance detecting elements in first and second positions, respectively, where changes in magnetic impedance with respect to transmission torque of the flexible external gear show opposite properties, whereby a transmission torque is detected on the basis of detected outputs of the first and second magnetic impedance elements.

As a flexible external gear, a cup-shaped one and a silk-hat-shaped one are generally known as well as a circular one. A cup-shaped flexible external gear has a tubular body, a circular diaphragm integrally formed at one end of the body, a boss integrally formed in the center of the diaphragm, and the external teeth formed on an outer periphery on the side of an open end of the body. In this case, the first magnetic impedance element may be placed at the end portion on the side of the diaphragm of the body, while the second magnetic impedance element may be placed on the boundary portion with the boss of the diaphragm. In these positions, the magnetic impedance changes linearly according to a torque change, and the lines incline oppositely to each other. It is preferable in that a linear torque detection output passing through a zero point can be obtained if one of the outputs of the first and second magnetic impedance elements is subtracted from the other.

A silk-hat-shaped flexible external gear, on the other hand, has a tubular body, a circular diaphragm continued from one end of the body and extending radially and outwardly therefrom, a circular boss formed integrally from an outer peripheral edge of the diaphragm, and the external teeth formed on an outer periphery of the other end of the body. In this case also, the first magnetic impedance element may be placed at the end portion on the side of the diaphragm of the body, while the second magnetic impedance element may be placed on the boundary portion with the boss of the diaphragm.

This invention can be similarly applied to a flexible contact type reduction unit. That is, in a torque detecting device for a flexible contact type reduction unit which has a circular rigid member, a circular flexible member placed inside the circular rigid member and having an outer periphery capable of frictionally contacting with an inner periphery of the rigid member, and a wave generator for deforming the flexible member radially so as to frictionally contact with the inner periphery partially and for moving frictionally contacted positions circumferentially to thereby generate relative rotation between the rigid member and the flexible member according to a difference in perimeter between the outer periphery and the inner periphery; the flexible member is provided with first and second magnetic impedance detecting elements in the first and second positions thereof, respectively, where changes in magnetic impedance with respect to the rotational torque of the flexible member show opposite properties, and the rotational torque is detected on the basis of the detected output of the first and second magnetic impedance elements.

In this case, too, as the flexible member, a cup-shaped flexible member can be employed, which has a tubular body, a circular diaphragm integrally formed at one end of the body, a boss integrally formed in the center of the diaphragm, and an outer peripheral frictionally-contacting surface formed on the outer periphery on the side of an open end of the body, wherein the first magnetic impedance element may be placed at the end portion on the side of the diaphragm of the body, while the second magnetic impedance element may be placed on the boundary portion with the boss of the diaphragm.

While, as the flexible member, a silk-hat flexible member can also be employed, which has a tubular body, a circular diaphragm integrally formed at one end of the body and extending outward in the radial direction, a circular boss formed integrally at an outer peripheral edge of the diaphragm, and an outer peripheral frictionally-contacting surface formed on the outer periphery on the side of the other end of the body, wherein the first magnetic impedance element may be placed at the end portion on the side of the diaphragm of the body, while the second magnetic impedance element may be placed on the boundary portion with the boss of the diaphragm.

BEST MODE FOR CARRYING OUT THE INVENTION

Now this invention will be described in detail with reference to the attached drawings..

Figure 1:
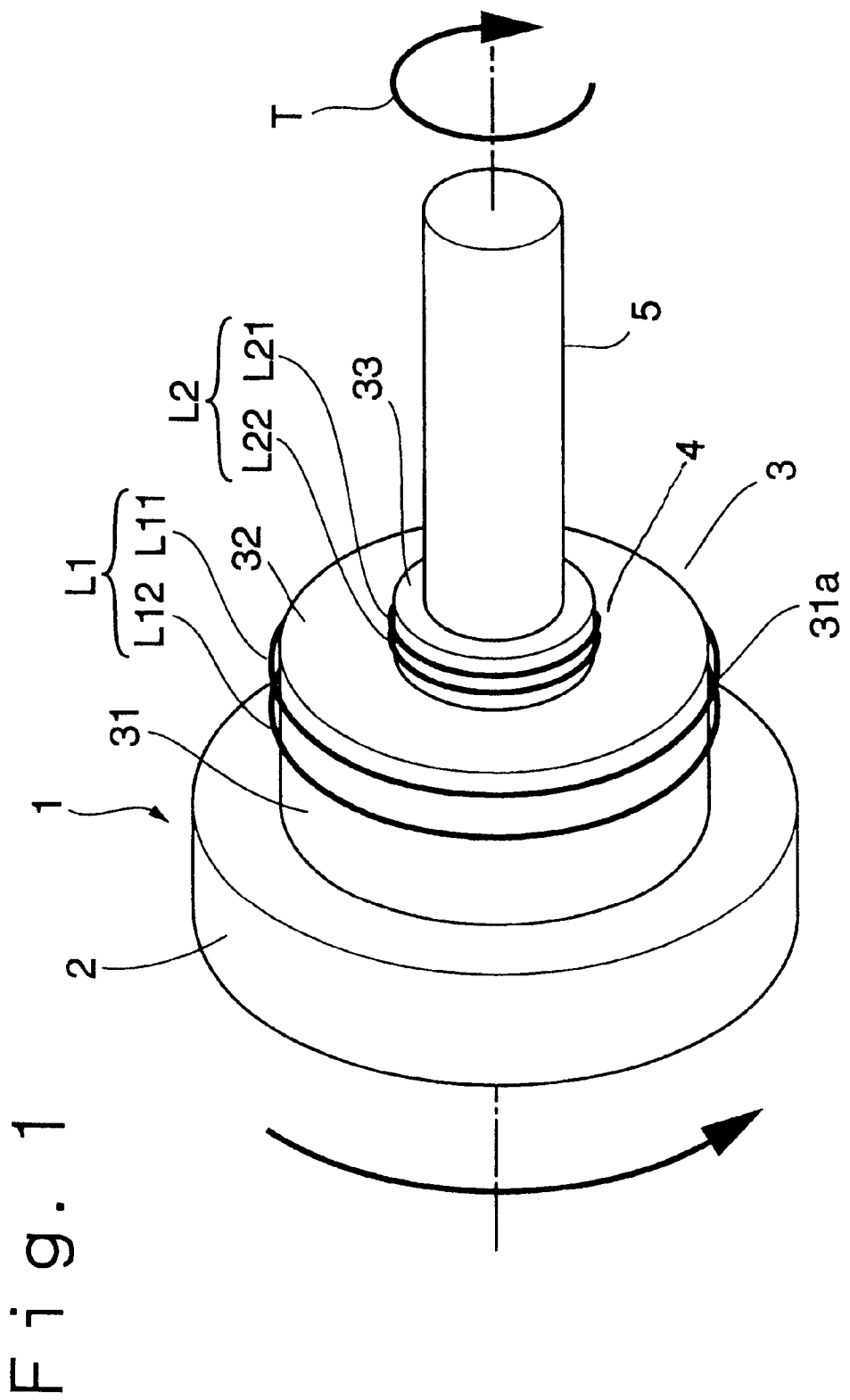
FIG. 1 illustrates a magnetic impedance detecting position in a cup-shaped flexible meshing type gear according to this invention.

FIG. 1 illustrates a cup-shaped flexible meshing type gear according to this invention. The flexible meshing type gear 1 has a circular rigid internal gear 2, a cup-shaped flexible external gear 3 placed inside the gear 2, and a wave generator (not shown) having an elliptical profile and fit in the gear 3, wherein a rotational shaft (not shown) is connected to the center of the wave generator.

Figure 5:
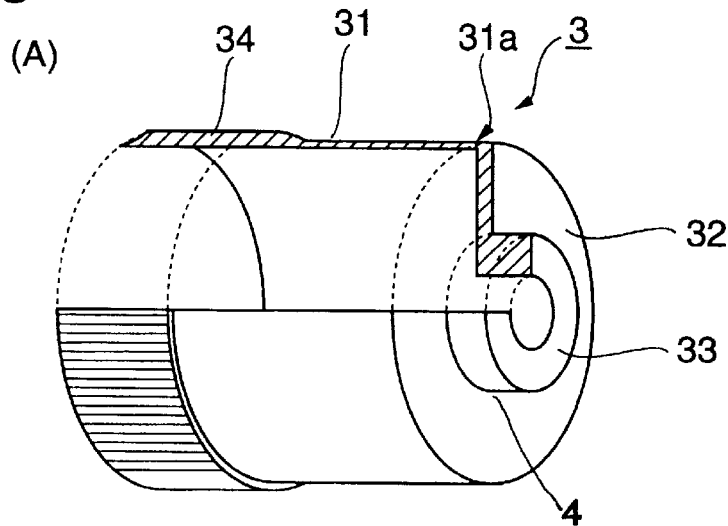
FIG. 5(A) illustrates the cup-shaped flexible external gear.
FIG. 5(B) is a graph indicating the detected values obtained in positions 31a and 4 in FIG. 5(A)
FIG. 5(C) is a graph of a characteristic obtained by subtraction of the two detected values.
Figure 5:
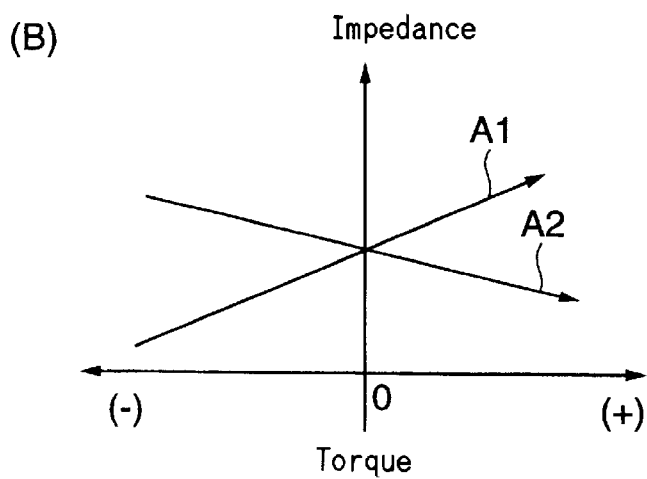
Figure 5:
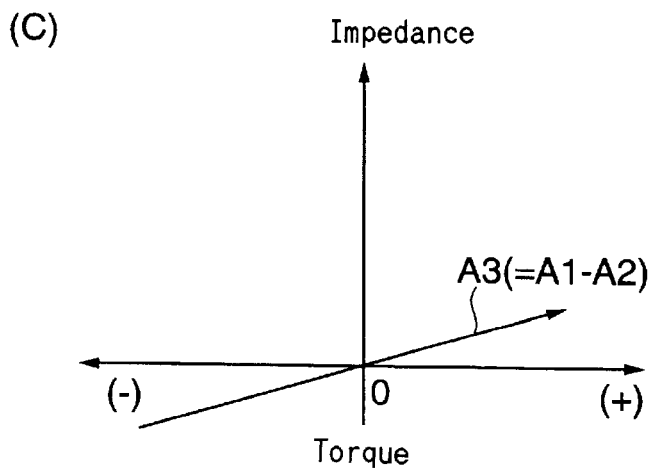

The flexible external gear 3 (see FIG. 5) has a tubular body 31, a circular diaphragm 32 integrally formed at one end of the body, a boss 33 integrally formed in the center of the diaphragm 32, and external teeth 34 formed on the outer periphery of an open end of the body 31. A reduction rotational output shaft 5 is connected coaxially to the boss 33.

For example, if the circular rigid internal gear 2 is fixed, the high-speed rotational input to the wave generator is greatly reduced according to the difference in tooth number between internal teeth (not shown) on the side of the rigid internal gear 2 and the external teeth 34 on the side of the flexible external gear 3, and reduced rotation is derived from the output shaft 5 connected to the flexible external gear 3. Since the principle of reduction mechanism of a flexible meshing type gear is well known, explanation thereof is omitted here.

In the thus constituted cup-shaped flexible meshing type gear 1, a rotational torque T is detected as follows. First, as shown in FIG. 1, a first magnetic impedance detecting element L1 (double copper wire coils L11 and L12) is placed on the outer periphery of the body 31 of the flexible external gear 3. These coils L11 and L12 are placed at an end portion 31a (first position) of the body 31, continued to the diaphragm 32. Whereas, on a boundary portion 4 (second position) between the diaphragm 32 and the boss 33, double copper wire coils L21 and L22 are placed as a second magnetic impedance detecting element L2.

Figure 2:
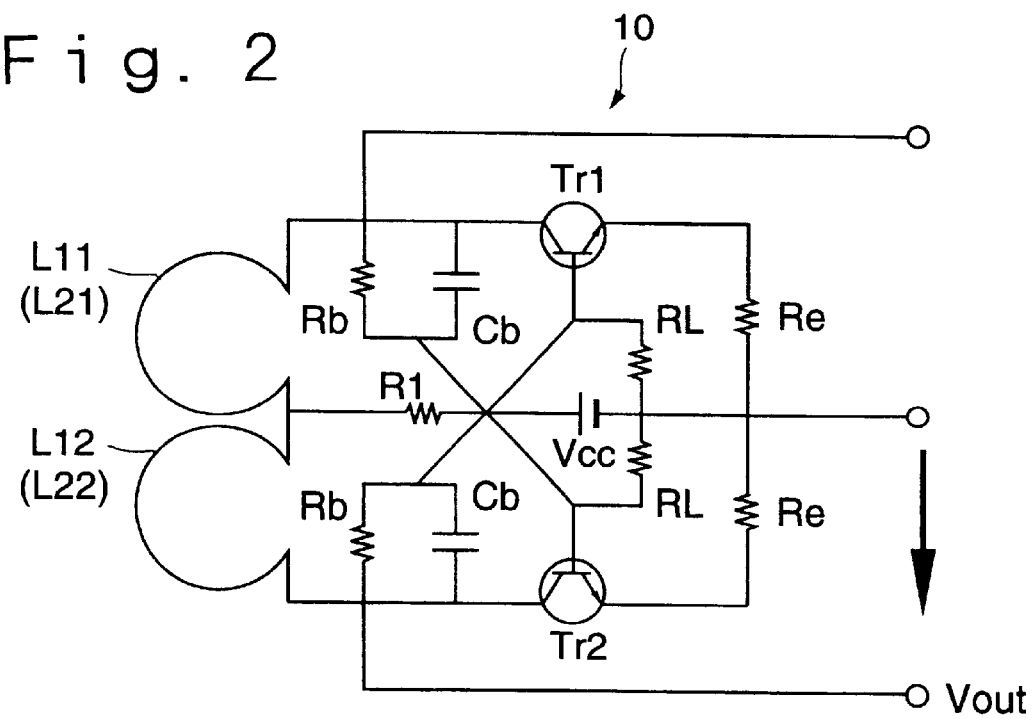
FIG. 2 is a circuit diagram of an example of a magnetic impedance detecting circuit which can be used to reduce this invention in practice.

FIG. 2 shows an example of torque detecting circuits connected to the magnetic impedance elements L1 and L2, respectively. The change in magnetic impedance relative to a torque change detected by each of the coils L11 (L21) and L12 (L22) is output by a detecting circuit 10 in question as a voltage value Vout.

Figure 3:
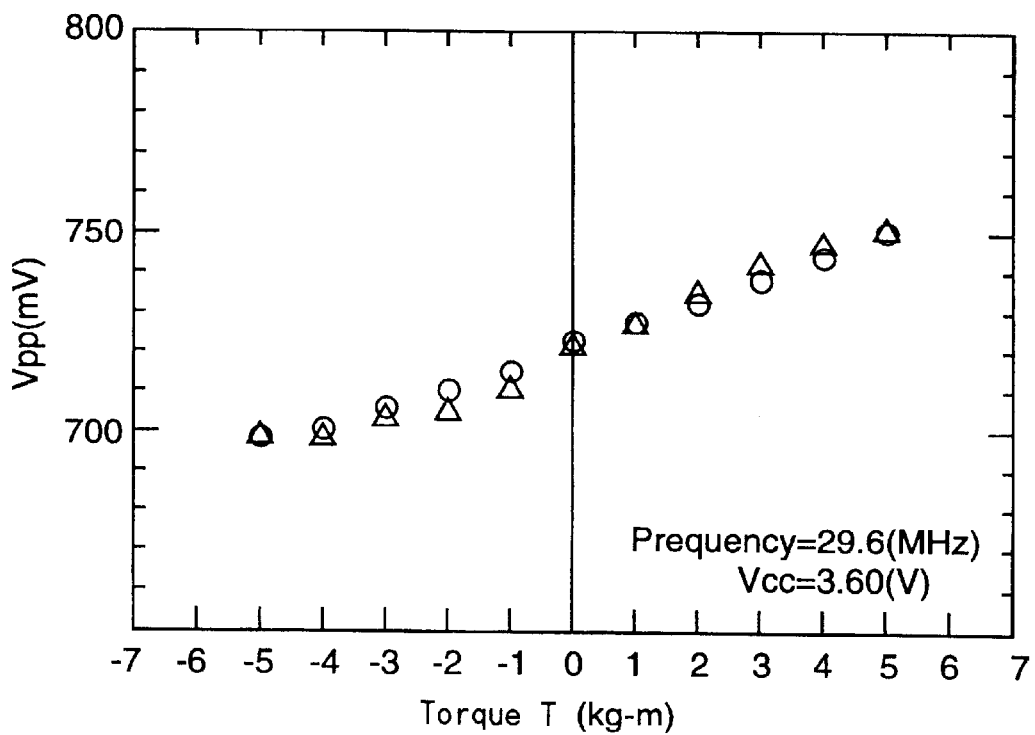
FIG. 3 is a graph plotting a change in detected output voltage according to magnetic impedance changes relative to a torque change, measured at the end of the body of a flexible external gear.
Figure 4:
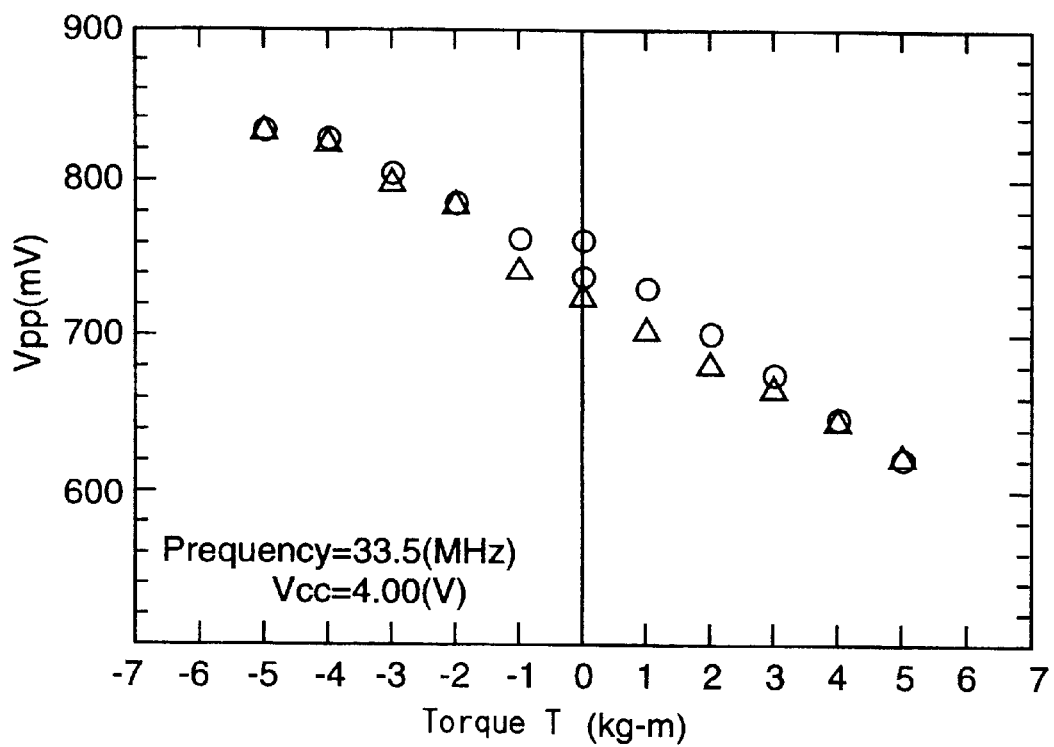
FIG. 4 is a graph plotting a change in detected output voltage according to magnetic impedance changes relative to a torque change, measured on the boundary portion between a diaphragm and a boss of the flexible external gear.

Examples of the results of measurement by means of the torque detecting device having the configuration shown in FIGS. 1 and 2 are indicated in FIGS. 3 and 4. The graph in FIG. 3 is the output of the first magnetic impedance detecting element L1. The driving electrical current having the frequency of 29.6 MHz was used, and the voltage value was 3.60 V. As is seen from this graph, the change in output voltage, namely, the change in magnetic impedance, varies almost linearly with a positive slope with respect to torque T.

The graph in FIG. 4, on the other hand, is the output of the second magnetic impedance detecting element L2. Here the driving electrical current having the frequency of 33.5 MHz was used, and the voltage value was 4.00 V. As is clear from this graph, the change in output voltage varies almost linearly with a negative slope with respect to torque T.

Thus, in the portions of the flexible external gear 3 where the first and second magnetic impedance elements L1 and L2 are placed respectively, the magnetic impedance varies linearly oppositely to the torque change. Accordingly, by subtracting one of the outputs obtained in these two positions from the other, it is possible to obtain such a torque detecting property as will pass through the origin when the rotational torque T is zero. Thus on the basis of this torque detecting property, it is now possible to measure the rotational torque T of the flexible meshing type gear with accuracy.

In sum, in the case of the cup-shaped flexible external gear 3 as shown in FIG. 5(A), the change property of the magnetic impedance relative to torque detected at the end portion 31a (first position) of the body thereof can be represented as an approximate straight line A1 with a positive slope shown in FIG. 5(B). Similarly, the change property of the magnetic impedance relative to torque detected on the boundary portion 4 (second position) between the diaphragm 32 and the boss 33 can be represented as an approximate straight line A2 with a negative slope shown in FIG. 5(B). Accordingly, as shown in FIG. 5(C), for example, after finding a characteristic A3 passing through a zero point by subtracting A2 from A1, it is now possible to measure the rotational torque of the flexible meshing type gear with accuracy on the basis of the characteristic A3.

The reason why the detected results with opposite properties are obtained in the above detection positions 31a and 4 may be the following: in general, residual stress introduced in a manufacturing process of a cup-shaped flexible external gear goes in the circumferential direction of the external gear, and the distribution of the residual stress in the circumferential direction may be opposite in the detection positions 31a and 4.

Accordingly, when the torque in a negative direction is added to residual stress in the detection positions, the entire stress increases, and the permeability of regions of the detection positions decreases; while when the torque in a positive direction is added to residual stress in the opposite direction, the residual stress is offset, the entire stress decreases, and the permeability $\mu$ increases.

The detection position 31a is convex as a whole, and tension is generated as residual stress. The detection position 4, on the other hand, is concave, and compression is generated as residual stress. Thus in these positions, residual stress is generated in opposite directions in the axial direction of the device. Accordingly, in the circumferential direction, too, residual stress may be generated in opposite directions.

(Detection Positions)

The detection positions may not be limited to the aforementioned positions 31a and 4. If a pair of positions where a change in magnetic impedance with high linearity with opposite properties as in the above example are selected, torque can be measured as described above.

(Magnetic Impedance Detecting Circuit)

Such a magnetic impedance detecting circuit can be employed in which a search coil is placed so as to compose an alternating bridge circuit on the outer periphery of the measurement position of the flexible external gear, to thereby measure magnetic impedance. Instead, the detecting circuit may be composed of an MI (magnetic impedance) element.

(Shape of the Flexible External Gear)

Figure 6:
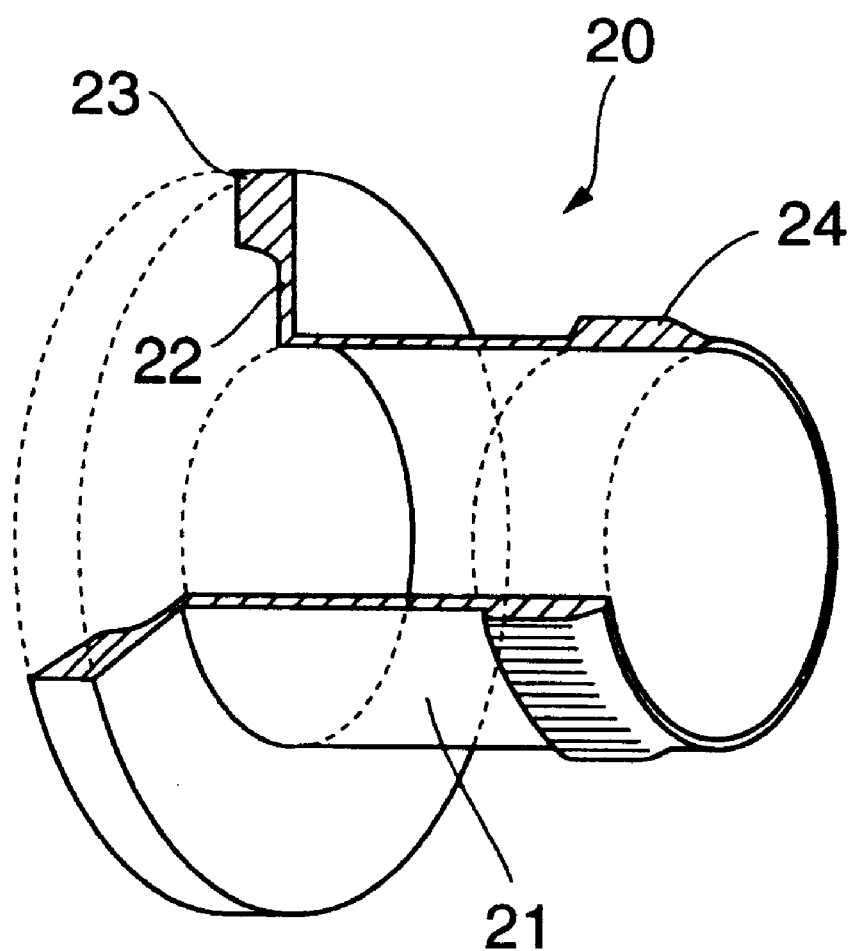
FIG. 6 illustrates a silk-hat flexible external gear.

In the aforementioned example, a cup-shaped flexible external gear was employed. It goes without saying that this invention can be applied to a silk-hat flexible external gear as shown in FIG. 6, for example. A silk-hat flexible external gear 20 has a tubular body 21, a circular diaphragm 22 adjacent to one end of the body 21 and extending outward in the radial direction, a circular boss 23 adjacent to the outer peripheral edge of the diaphragm 22, and external gears 24 formed on the outer periphery of the other end of the body.

Needless to say, this invention can be applied to a flexible meshing type gear having a flexible external gear of other shapes.

(Other Embodiments)

In the aforementioned description, this invention was applied to a flexible meshing type gear. This invention, however, can also be applied to rotational members composing a rotational force transmission mechanism other than the above-mentioned gear. That is, as in the case of a flexible external gear, this invention can be applied to a member which will exhibit a change in magnetic impedance with opposite properties to each other in two positions according to a torque change.

Further, in the above example, this invention was applied to a gear device. Instead, this invention can be applied to a frictional-transmission-type reduction unit which reduces speed according to a reduction operation principle similar to a principle in the case of the above-mentioned flexible meshing type gear.

Industrial Applicability

As was described above, according to this invention, it was found that in the case of a flexible external gear of a flexible meshing type gear, two positions exist where changes in magnetic impedance relative to a torque change appear with opposite properties to each other, and on the basis of this discovery, torque is detected by means of the properties in question. Accordingly, by employing a configuration different from a conventional one, it is possible to provide a torque detecting device with accuracy.

We claim:

1. A torque detecting device for a flexible meshing type gear which has a circular rigid internal gear, a circular flexible external gear placed inside the rigid internal gear and having external teeth which can mesh with internal teeth of the rigid internal gear, and a wave generator for deforming the flexible external gear radially so as to mesh the external teeth partially with the internal teeth and for moving meshed positions of the teeth circumferentially so that relative rotation is generated between the rigid internal gear and the flexible external gear according to a difference in tooth number between the external teeth and the internal teeth characterized by providing:

first and second magnetic impedance detecting elements which are placed in first and second positions of the flexible external gear, respectively, where changes in magnetic impedance with respect to the rotational torque of the flexible external gear exhibit opposite properties, whereby a rotational torque is detected on the basis of detected outputs of the first and second magnetic impedance elements.

2. A torque detecting device for a flexible meshing type gear according to claim 1, wherein said flexible external gear is of a cup shape having a tubular body, a circular diaphragm integrally formed on the side of one end of the body, a boss integrally formed in the center of the diaphragm, and the external teeth formed on an outer periphery on the side of an open end of the body, and wherein said first magnetic impedance element is placed at the end portion on the side of the diaphragm of the body, and said second magnetic impedance element is placed on the boundary portion with the boss of the diaphragm.

3. A torque detecting device for a flexible meshing type gear according to claim 1, wherein said flexible external gear is of a silk hat shape having a tubular body, a circular diaphragm adjacent to one end of the body and extending outward in the radial direction, a circular boss formed adjacent to an outer peripheral edge of the diaphragm, and the external teeth formed on an outer periphery on the side of the other end of the body, and wherein said first magnetic impedance element is placed at the end portion on the side of the diaphragm of the body, and said second magnetic impedance element is placed on the boundary portion with the boss of the diaphragm.

4. A torque detecting device for a flexible contact type reduction unit which has a circular rigid member, a circular flexible member placed inside the rigid member and having an outer peripheral frictionally-contacting surface which is capable of frictionally contacting with an inner peripheral frictionally-contacting surface of the rigid member, and a wave generator for deforming the flexible external member radially so as to contact the external frictionally-contacting surface partially with the internal frictionally-contacting surface and for moving frictionally contacted positions circumferentially so that relative rotation is generated between the flexible member and the rigid member according to a difference in perimeter between the outer peripheral frictionally-contacting surface and the inner peripheral frictionally-contacting surface characterized by providing:

first and second magnetic impedance detecting elements which are placed in first and second positions of the flexible member, respectively, where changes in magnetic impedance with respect to the rotational torque of the flexible member exhibit opposite properties, whereby a rotational torque is detected on the basis of detected outputs of the first and second magnetic impedance elements.

5. A torque detecting device for a flexible contact type reduction unit according to claim 4, wherein said flexible member is of a cup shape having a tubular body, a circular diaphragm integrally formed on the side of one end of the body, a boss integrally formed in the center of the diaphragm, and said outer peripheral frictionally contacting surface formed on an outer periphery on the side of an open end of the body, and wherein said first magnetic impedance element is placed at the end portion on the side of the diaphragm of the body, and said second magnetic impedance element is placed on the boundary portion with the boss of the diaphragm.

6. A torque detecting device for a flexible contact type reduction unit according to claim 4, wherein said flexible member is of a silk hat shape having a tubular body, a circular diaphragm adjacent to one end of the body and extending outward in the radial direction, a circular boss formed adjacent to an outer peripheral edge of the diaphragm, and said outer peripheral frictionally contacting surface formed on an outer periphery on the side of the other end of the body, and wherein said first magnetic impedance element is placed at the end portion on the side of the diaphragm of the body, and said second magnetic impedance element is placed on the boundary portion with the boss of the diaphragm.

* * * * *